United States Patent
Shumate et al.

(10) Patent No.: US 8,104,519 B1
(45) Date of Patent: Jan. 31, 2012

(54) PIPE INSULATION PRODUCT WITH CHARGE DISSIPATER

(75) Inventors: Monroe William Shumate, Littleton, CO (US); Derek Cooper Bristol, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 12/855,856

(22) Filed: Aug. 13, 2010

(51) Int. Cl.
*F16L 9/14* (2006.01)
*B32B 17/02* (2006.01)

(52) U.S. Cl. ....... 138/149; 138/151; 138/156; 428/34.5; 428/35.9

(58) Field of Classification Search ........... 138/149, 138/151, 156, DIG. 1; 428/34.5, 35.9, 354, 428/406, 34.2, 41.3, 61
See application file for complete search history.

(56) References Cited

U.S. PATENT DOCUMENTS

| | | | | |
|---|---|---|---|---|
| 3,442,750 A | | 5/1969 | Wilcox | 428/109 |
| 4,022,248 A | * | 5/1977 | Hepner et al. | 138/141 |
| 4,213,487 A | * | 7/1980 | Funk et al. | 138/149 |
| 4,243,453 A | * | 1/1981 | McClintock | 156/152 |
| 4,595,615 A | * | 6/1986 | Cohen | 428/34.2 |
| 4,606,957 A | * | 8/1986 | Cohen | 428/40.9 |
| 4,780,347 A | | 10/1988 | Cohen | 428/34.2 |
| 4,842,908 A | * | 6/1989 | Cohen et al. | 428/34.2 |
| 4,980,205 A | | 12/1990 | Haskell | 427/294 |
| 5,104,701 A | * | 4/1992 | Cohen et al. | 428/34.5 |
| 5,516,580 A | | 5/1996 | Frenette et al. | 442/153 |
| 5,776,841 A | | 7/1998 | Bondoc et al. | 442/320 |
| 5,783,268 A | * | 7/1998 | Noonan et al. | 428/34.5 |
| 6,270,865 B1 | * | 8/2001 | Noonan et al. | 428/34.5 |
| 6,953,512 B2 | * | 10/2005 | Cohen et al. | 156/248 |
| 7,749,923 B2 | * | 7/2010 | Moore et al. | 442/23 |
| 2004/0137181 A1 | | 7/2004 | Ruid et al. | 428/36.91 |
| 2010/0229997 A1 | * | 9/2010 | Moore et al. | 138/149 |

* cited by examiner

*Primary Examiner* — Patrick F Brinson
(74) *Attorney, Agent, or Firm* — Robert D. Touslee

(57) ABSTRACT

A pipe insulation product including a core of insulating material and a roughly rectangular laminate. The core may include an outer surface; an inner surface; and a wall extending between the outer and inner surfaces. The laminate may include a foil or metallized polymeric film sheet layer, a scrim, a porous media sheet layer, and a polymeric film sheet layer bonded together via an adhesive. The polymeric film sheet layer may also include a closure flap that adhesively couples opposite ends of the laminate together to form a cylindrical tube with the core enclosed therein. A charge dissipator may be applied to the polymeric film sheet layer in an amount sufficient to reduce generation of a static charge on the laminate's exterior surface without affecting the closure flap's ability to adhesively couple the opposite ends of the laminate.

20 Claims, 4 Drawing Sheets

PIPE INSULATION PRODUCT WITH CHARGE DISSIPATER

CROSS-REFERENCES TO RELATED APPLICATIONS

This application is related to the following Non-Provisional U.S. Patent Applications: U.S. patent application Ser. No. 12/855,876 filed on Aug. 13, 2010 by Shumate, entitled "Systems and Methods for Insulating a Pipe;" U.S. patent application Ser. No. 12/855,833 filed on Aug. 13, 2010 by Shumate et al., entitled "Insulation Product with Inward Curling Closure Flap;" and U.S. patent application Ser. No. 12/855,868 filed on Aug. 13, 2010 by Shumate et al., entitled "Pipe Insulation Products and Methods."

The entire disclosures of all of the aforementioned Non-Provisional U.S. Patent Applications are hereby incorporated by reference, for all purposes, as if fully set forth herein.

BACKGROUND OF THE INVENTION

The subject invention relates generally to pipe insulation products and more specifically to pipe insulation products comprising an insulating material core enclosed within a laminate jacket.

Piping is often used to transport one or more fluids between destinations. For example, piping may be used to transport water, petroleum, oxygen, etc. The piping is often made from a metal material, such as copper, stainless steel, galvanized steel, aluminum, brass, titanium, etc., or from a plastic material, such as polyvinyl chloride (PVC), chlorinated polyvinyl chloride (CPVC), fiber reinforced plastic (FRP), polypropylene (PP), polyethylene (PE), etc. Piping may also be made from a ceramic, fiberglass, or concrete material, although these pipes are less common.

During fluid transportation, the fluid may be subjected to heating and/or cooling from the surrounding environment. For example, the fluid may be transported in either a hot or cold state relative to the surrounding environment, which induces heat transfer to or from the fluid and pipes. HVAC systems are a common example of systems that routinely utilize various pipe configurations to transport hot or cold fluids. Due to the conductive nature of the pipes (especially metal pipes), heat may be conducted to or from the fluid during transportation. The addition or removal of heat may result in the decreased efficiency of a system and/or increased time and/or expense in operating the system. For example, in HVAC systems, the addition of heat to cooled fluids may result in loss of efficiency for a cooling unit and may also result in increased expense because of increased operating time and energy needed to achieve a desired cooling level.

To reduce heat transfer during fluid transportation, pipe insulation products are commonly installed on one or more sections of pipes to retard the flow of heat to or from the pipes. Commonly, one or more sections of pipe are fitted with a pipe insulation product where the sections of pipe are generally fully encased within the pipe insulation product. Separate sections of pipe insulation product are often coupled together via adhesive tapes. The outer surface of the pipe insulation product is often designed to enhance the visual appeal of the piping system and serve as a means for sealing the pipe insulation product about the pipes of the piping system. Individual segments of pipe insulation products typically range in length from about 36 inches to about 48 inches; have a wall thickness ranging from about 0.5 inches to about 3 inches; and a range in outside diameter from about 2 inches to about 32 inches. The pipe insulation product may also be used to reduce degradation and/or corrosion of the pipe.

The outer surface of the pipe insulation product, however, may be susceptible to damage which may degrade the visual quality of the pipe insulation product and/or piping system in which it is used. For example, individual segments of pipe insulation product are often packaged and shipped together. During shipping, the vibrational forces imparted to the individual segments and/or the jostling that occurs between the segments and/or the packaging may result in scuff marks and/or creases forming on the outer surface of the pipe insulation product. In addition, a static charge may build up on the pipe insulation product's outer surface, which may cause pieces of dust (e.g., fiberglass dust) to accumulate on the pipe insulation product's outer surface and/or cause a static discharge between the outer surface and a surrounding object. The static discharge may be a source of discomfort for handlers of the pipe insulation product or, in extreme cases, may be the source for a fire. In any event, the scuff marks, creases, and/or dust accumulation may be apparent to individuals viewing the piping system and pipe insulation product. These visible marks may degrade the overall appearance of the building or structure in which they are used and/or may leave a negative impression on the viewer as to the quality of the pipe insulation product.

BRIEF SUMMARY OF THE INVENTION

One embodiment of the present invention may include a pipe insulation product that includes a tubular core of insulating material and a laminate bonded to the tubular core. The tubular core may include a length and a longitudinal axis; a substantially cylindrical outer surface; a substantially cylindrical inner surface; and a wall extending between the cylindrical outer surface and the cylindrical inner surface. The wall may include a radially extending thickness and a slit that extends from the cylindrical outer surface to the cylindrical inner surface and that extends parallel to the longitudinal axis of the tubular core for the length of the tubular core.

The laminate may include a foil or metallized polymeric film sheet layer that forms an inner layer of the laminate and that provides a fluid vapor barrier to minimize fluid vapor transmission through the laminate. The laminate may also include a scrim comprising a mesh of a plurality of fibers. The laminate may further include a porous media sheet layer, where the scrim or porous media sheet layer or both provide reinforcement for the laminate. The laminate may additionally include a polymeric film sheet layer that forms an outer exposed layer of the laminate. The foil or metallized polymeric film sheet layer, the scrim, the porous media sheet layer, and the polymeric film sheet layer may be bonded together with an adhesive to form the laminate.

The laminate may additionally include a closure flap configured to adhesively couple opposite sides of the laminate so that the laminate forms a substantially cylindrical shape with at least a portion of the tubular core enclosed therein; and the laminate may include a charge dissipator applied to the polymeric film sheet layer in an amount sufficient to reduce a static charge on the exterior surface of the laminate without affecting the closure flap's ability to adhesively couple the opposite ends of the laminate. The charge dissipator may provide increased resistance to shipping damage during transportation of the pipe insulation product. The laminate may be flexible so that the tubular core and laminate can be opened, placed about a pipe, and closed without degrading the laminate.

The charge dissipator may provide increased resistance to shipping damage by reducing friction between the pipe insulation product and one or more surrounding objects during transportation of the pipe insulation product. In addition, the charge dissipator may reduce a static charge by reducing the generation of a static charge on the exterior surface of the laminate.

According to another embodiment, the present invention may include a method for producing a roughly rectangular laminate jacket for a pipe insulation product. The method may include providing a foil or metallized polymeric sheet material that forms an inner layer of the laminate and that provides a fluid vapor barrier to minimize fluid vapor transmission through the laminate. The method may also include providing a scrim comprising a mesh of a plurality of fibers. The method may further include providing a porous media sheet material. The method may additionally include providing a polymeric sheet material that forms an outer exposed layer of the laminate.

The method may additionally include bonding the foil or metallized polymeric sheet material, the scrim, the porous media sheet material, and the polymeric sheet material together with an adhesive to form the laminate jacket. The laminate jacket may include a closure flap configured to adhesively couple opposite sides of the laminate jacket so that the laminate jacket forms a hollow cylindrical shape. The method may additionally include applying a charge dissipator to the polymeric film sheet material in an amount sufficient to reduce a static charge on the exterior surface of the laminate jacket without affecting the closure flap's ability to adhesively couple the opposite ends of the laminate jacket. The charge dissipator may provide increased resistance to shipping damage during transportation of the pipe insulation product.

The method may additionally include positioning a tubular core of insulating material adjacent to the foil or metallized polymeric sheet material and bonding the tubular core of insulating material and the foil or metallized polymeric sheet material with an adhesive to form the pipe insulation product. The pipe insulation product may be flexible so that the tubular core and laminate jacket can be opened, placed about a pipe, and closed without degrading the laminate jacket.

According to another embodiment, the present invention may include a pipe insulation product including a tubular core of insulating material. The tubular core may include a length and a longitudinal axis; a substantially cylindrical outer surface; a substantially cylindrical inner surface; and a wall extending between the cylindrical outer surface and the cylindrical inner surface. The wall may include a radially extending thickness and a slit that extends from the cylindrical outer surface to the cylindrical inner surface and that extends parallel to the longitudinal axis of the tubular core for the length of the tubular core.

The laminate may include a foil or metallized polymeric film sheet layer that forms an inner layer of the laminate and that provides a fluid vapor barrier to minimize fluid vapor transmission through the laminate. The laminate may also include a porous media layer, where the porous media layer provides reinforcement for the laminate. The laminate may further include a polymeric film sheet layer that forms an outer exposed layer of the laminate. The foil or metallized polymeric film sheet layer, the scrim, the porous media sheet layer, and the polymeric film sheet layer may be bonded together with an adhesive to form the laminate. The porous media layer or the foil or metallized polymeric film sheet layer, or both, may be an electrically conductive material. In addition, the porous media layer or the foil or metallized polymeric film sheet layer, or both, may be configured to dissipate a charge that is generated on the surface of the laminate.

The porous media layer may include a porous media and a scrim that includes a mesh of a plurality of fibers. The scrim may be an electrically conductive material and may be positioned directly adjacent to the polymeric film sheet layer to dissipate a charge from the laminate's outer surface. In addition, the foil or metallized polymeric film sheet layer may be positioned directly adjacent to the polymeric film sheet layer to dissipate the charge from the laminate's outer surface. A charge dissipator may be applied to the polymeric film sheet layer in an amount sufficient to reduce generation of a static charge on the exterior surface of the laminate. The charge dissipator may provide increased resistance to shipping damage during transportation of the pipe insulation product.

DETAILED DESCRIPTION OF THE INVENTION

Figure 1:
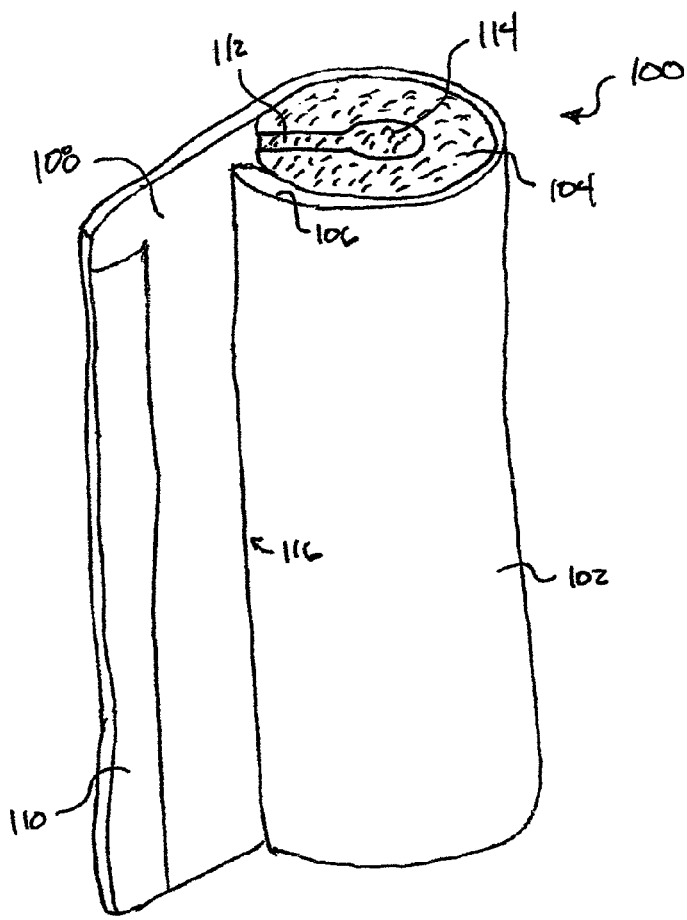
FIG. 1 is a schematic perspective view of a pipe insulation product that includes a core of insulating material encased within a laminate jacket.

The present invention includes a pipe insulation product that is used to insulate and/or protect one or more sections of pipe. For example, in addition to minimizing heat transfer between the insulated sections of pipe and the surrounding environment, the pipe insulation product may also shield or protect the pipe from one or more environmental elements (e.g., water vapor). The protection/shielding function minimizes potential risks for the pipe and/or for surrounding objects (e.g., condensation of water vapor on the pipes; mold, mildew, and/or fungal growth; water drip damage; loss of the pipe insulation product's insulating value; etc.).

The pipe insulation product may also serve an aesthetic purpose when fitted about pipe sections. For example, pipe insulation products are often designed to provide a smooth, finished, and visually appealing outer surface to enhance the visual appeal of the piping systems. The pipe insulation product, however, may be susceptible to one or more types of damage during handling, shipping, and/or installation. One particular type of damage that the pipe insulation product may be susceptible to is shipping damage, where one or more visible marks or scars or other visually unappealing consequences (e.g., discoloration, dust accumulation, etc.) result from shipping the pipe insulation product. For example, during shipping, the packaged pipe insulation products may rub together and/or rub against the sides of the packaging container as the products jostle around and vibrate within the packaging container. One or more scuff marks may appear on the outer surface of the pipe insulation product due to the products rubbing together. The scuff marks may appear brownish, yellowish, or grayish-black and may run along a portion of the longitudinal length of the pipe insulation product.

In addition, a static charge may be generated on the outer surface of the pipe insulation product, which may result in a static discharge between the product and a person handling the product and/or a surrounding object. If the pipe insulation product is used in a flammable environment, such static discharge may create a potential fire hazard. Similarly, dust particles may accumulate and adhere to the outer surface of the pipe insulation product due to the generated static charge. In some cases, the outer surface of the pipe insulation product may be made of a non-conductive material, which may make dissipating the static charge difficult. Accumulation of dust particles may make the outer surface appear dull and/or yellowish or otherwise degrade the smooth, finished, visually appealing appearance of the pipe insulation product. The dust may further transfer to the hands and/or clothing of individuals who handle the pipe insulation product, which may be a form of discomfort or inconvenience for the handlers.

According to one embodiment of the invention, a charge dissipator may be applied to the outer surface of the pipe insulation product to make the pipe insulation product more resistant to shipping damage and/or to dissipate a static charge on the outer surface of the product. For example, the charge dissipator may reduce the amount of friction that the pipe insulation product experiences as the products jostle and vibrate during shipping and thereby reduce the scuffing that occurs on the outer surface and/or the generation of a static charge. Additionally, the charge dissipator may dissipate a static charge by making the outer surface more conductive (e.g., decreasing the surface resistivity). For example, the charge dissipator may be hydrophilic and attract moisture (e.g., water vapor) to the outer surface, which can help to dissipate a static charge due to the polar nature of water.

In addition, the charge dissipator may be applied for a predetermined amount of time or may be permanent. For example, the charge dissipator may be blended into the outer surface of the pipe insulation product so that the charge dissipator is permanent or the charge dissipator may be applied topically to the surface so that the charge dissipator may be wiped or washed from the surface after use. Similarly, the charge dissipator may be applied during the manufacture of the pipe insulation product or at any other time. Additional features of the present invention will be realized with reference to the figures.

As shown in FIG. 1, a pipe insulation product 100 may include a tubular core of insulating material 104 that may include a substantially cylindrical outer surface (i.e., the outside of the tubular core that directly contacts the laminate) and a substantially cylindrical inner surface 114. Extending between the cylindrical outer surface and the cylindrical inner surface 114 may be a wall of insulating material. The insulating material provides the insulating properties of the pipe insulation product 100. In one embodiment, the insulating material may be a fibrous material (e.g., fiberglass, mineral wool, refractory ceramic fiber, chopped strand fiber glass, etc.). In other embodiments the insulating material may be a foam (e.g., phenolic foam, polyisocyanurate, polyolefin, polystyrene, polyurethane), a polymer, foam glass, microporous insulation (e.g., Microtherm®), or any other material that provides insulation.

The cylindrical inner surface 114 may be configured to correspond with a specific pipe outer diameter (e.g., ½ inch, 1 inch, etc.). The tubular core 104 may also include a longitudinally extending slit 112 that passes completely through the wall of insulating material on one side and into the interior of the substantially cylindrical inner surface 114 so that the tubular core 104, and thus, the pipe insulation product 100, can be opened, passed over, and closed about a pipe.

Circumferentially surrounding and encasing the tubular core 104 is a laminate jacket or simply a laminate 102. The laminate 102 has a thickness 106 that includes one or more layers of various materials as described below. The laminate 102 is roughly co-extensive with the tubular core 104 and bonded to the cylindrical outer surface. The laminate 102 may be positioned so that a longitudinal edge portion 116 extends parallel and adjacent to the slit 112, but does not overlap the slit 112. The laminate 102 includes a closure flap 108 that may have a pressure sensitive adhesive layer 110 so that the laminate 102 may be adhesively sealed in a closed position fully encasing the tubular core 104 within the laminate 102. The laminate may be sealed by folding or overlapping the closure flap 108 over the longitudinal edge portion 116 of the laminate 102 and by applying pressure to the pressure sensitive adhesive layer 110 so that the closure flap 108 adhesively seals to the outer surface of the overlapped portion of the laminate 102.

The closure flap 108 may include a removable silicone treated release strip (not shown) removably adhered to the pressure sensitive adhesive layer 110 to protect the adhesive material from degradation prior to installation. Maintaining a sealed closed position is a critical function of the closure flap 108 and adhesive layer 110 so that the insulated pipe is not subjected to one or more environmental elements, such as water vapor. The laminate 102 may include one or more flame retardants, fungi growth inhibiting agents, charge dissipators, and/or other additives to enhance the performance of the laminate. Additionally, butt strips (not shown) may be used to connect individual segments of the pipe insulation product end to end. The butt strips may be strips of adhesive material (i.e., tape) that are substantially impermeable to fluid vapors to greatly restrict or eliminate the transmission of water vapor through the butt strips (i.e., the butt strips seal end segments of the pipe insulation product 100 together).

Figure 2:
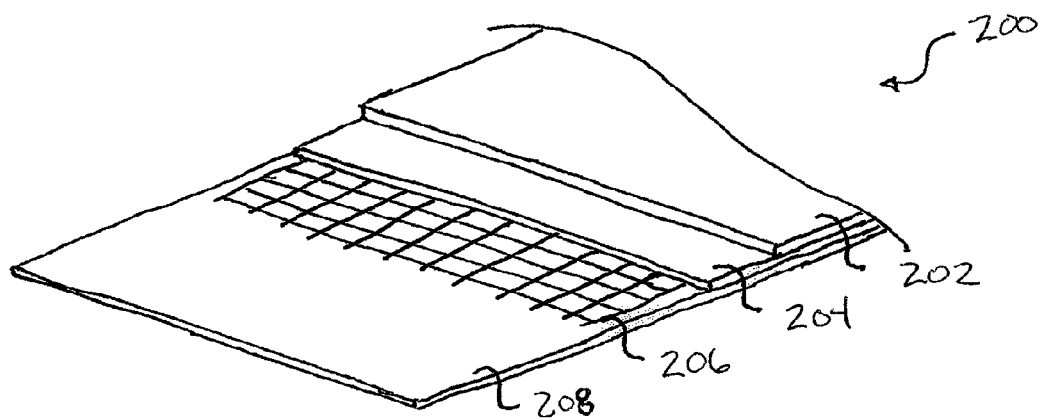
FIG. 2 is a schematic perspective view of a laminate jacket according to one embodiment of the present invention with portions of the laminate broken away to show the various layers of the laminate.

FIG. 2 depicts a laminate jacket 200 according to one embodiment of the present invention. FIG. 2 shows portions of the laminate 200 broken away to reveal the various layers of the laminate. The laminate 200 may include an inner layer composed of a foil or metallized polymeric film sheet 208. Preferably, the laminate 200 includes an inner layer that is made of aluminum foil or metallized polyethylene terephthalate (MPET) between about 0.48 mils and about 100 mils in thickness (between about 48 and 100 gauge in thickness). The inner layer aluminum foil or MPET provides a nearly impermeable fluid vapor barrier to fluids that are external to and surrounding the pipe insulation product. For example, the foil or metallized polymeric film sheet 208 is nearly impermeable to water vapor, which protects the insulated pipe from water condensation, corrosion, loss of insulating value, mold growth, etc. The foil or metallized polymeric film sheet 208 enables the laminate 200 to provide a water vapor transmission rate of less than 0.02 perms.

By using the foil or metallized polymeric film sheet 208, fluid may be passed through the insulated pipe and environmental elements (e.g., water vapor) in the surrounding environment may be restricted (or kept) from penetrating through laminate to the pipe. When cold fluid is passed through the pipe, the foil or metallized polymeric film sheet 208 prevents water vapor from condensing on the pipes and causing the associated problems described above. The use of a metallized polymeric film sheet in the laminate application provides increased resistance to handling damage such as creasing or wrinkling. Although the foil or metallized polymeric sheet 208 is described as the inner layer of the laminate 200, the foil or metallized polymeric sheet 208 may be positioned anywhere within the laminate (e.g., immediately adjacent the polymeric sheet outer layer).

The laminate 200 also includes a scrim 206. The scrim 206 may function to reinforce and strengthen the laminate 200. For example, the scrim may provide the laminate with increased tensile strength, puncture resistance, etc. The scrim 206 may be made of fiberglass reinforcing yarn, such as but not limited to a G75 or H110 yarn. In addition, the yarn may be configured to be from 2 to 6 strands per inch in both the machine and cross machine direction, with a typical scrim being about 5 strands per inch in both directions. In some embodiments the scrim 206 may be made of polyester strings or any other synthetic string. The scrim 206 may be positioned immediately adjacent to the foil or metallized polymeric sheet 208 or may positioned anywhere else within the laminate (i.e., may be positioned immediately adjacent the polymeric sheet outer layer 202).

The laminate 200 may further include a porous media sheet material 204 that may be positioned immediately adjacent to the scrim 204 and/or foil or metallized polymeric sheet 208. The porous media sheet 204 may be a kraft paper that is preferably between about 35 and 55 pounds/3000 square feet and may include one or more additives to enhance the performance of the laminate 200 (e.g., fire retardant additives and/or anti-microbial agents to prevent mold or fungal growth and prevent propagation of smoke and/or fire). Alternatively, the porous media sheet 204 may be other materials such as a fiberglass mat, synthetic mat, paper, etc.

The porous nature of the porous media sheet 204 may facilitate in absorbing and retaining one or more of the additives within the porous media sheet, and hence, within the laminate, which may increase the performance of the laminate. For example, one or more of the laminate's layers may be a potential fuel sources for a fire and/or may be susceptible to mold or fungal growth. Because the porous media sheet 204 may absorb and retain one or more additives, these risks may be greatly reduced with the inclusion of the proper type and amount of additives within the porous media sheet 204. These additives may be included within the adhesive that bonds the various layers of the laminate and/or the porous media sheet 204 may be pre-saturated with one or more additives. In addition, the stiffness of the porous media sheet 204 may provide increased stiffness and/or durability to the laminate 200.

In one embodiment, the porous media sheet 204 may be a conductive material and may be positioned immediately adjacent to the outer layer of the laminate (e.g., the polymeric film sheet) so that as a static charge is generated on the outer surface of the laminate, the conductive porous media sheet 204 dissipates the charge from the outer surface. Similarly, the scrim 206 may be a conductive material (e.g., the scrim may be manufactured using conductive fibers) and may be positioned immediately adjacent to the outer layer of the laminate to dissipate a static charge from the outer surface. In still another embodiment, the scrim 206 and porous media sheet 204 may be replaced by a single, preferably porous, material that may be conductive and may be positioned immediately adjacent to the laminate's outer layer (e.g., polymeric film sheet) to dissipate a static charge from the outer surface. The porous media sheet 204 may be conductive by including one or more additives in the adhesive material used to bond the layers (e.g., carbon black, graphite, etc.).

The laminate 200 additionally includes a polymeric film sheet outer layer 202. The polymeric film sheet 202 may be made of polypropylene, polyethylene, polyvinyl chloride, vinyl, saran, polyethylene terephthalate, thermoplastic polyolefin, etc. A polymeric film material may be selected as the laminate's 200 outer layer to provide one or more of the following advantages: shielding the porous media sheet 204 and/or insulating material from water vapor absorption; protecting against UV damage; protecting against mold, mildew, or fungal growth; providing a smooth, unwrinkled, visually appealing outer surface; etc. The polymeric film materials are generally non-porous and thus, unlike the porous media sheet 204, the polymeric film sheet 202 may not be capable of absorbing and retaining additives (e.g., flame retardant). Therefore, the use of the porous media sheet 204 may be necessary to ensure that the laminate 200 contains the necessary additives to sufficiently resist flame and smoke propagation; mold, mildew, or fungal growth; etc.

In addition, the polymeric film materials are often non-conductive and/or hydrophobic (i.e., an insulating material), which may impede the dissipation of any generated static charge from the laminate's outer surface. To increase the laminate's resistance to static charge generation and/or to dissipate a generated static charge from the laminate's outer surface, a charge dissipator may be applied to the polymeric film sheet 202. The charge dissipator may be blended with the polymeric film sheet 202 so that the charge dissipator is incorporated into the polymeric film sheet 202. In another embodiment, the charge dissipator may be applied topically to the outer surface of the laminate (e.g., sprayed on, coated, etc.). The charge dissipator may be permanent or temporary based on need, application, etc.

The charge dissipator may include lubricating properties to reduce the amount of friction between the laminate's outer surface and one or more objects (e.g., another pipe insulation product, a wall of a shipping package, etc.). Alternatively or additionally, the charge dissipator may also include static charge dissipating properties to dissipate a generated static charge (e.g., the charge dissipator may be hydrophilic, ionized, etc.). The charge dissipator may include a quaternary ammonium cation compound (e.g., BASF Larostat®); an alkylphenol compound; a glycol compound; glycol esters compound; an unsaturated aliphatic compound; a mineral oil compound; graphite, carbon black, water, ionized air, etc. The charge dissipator may increase the polymeric film sheet's 202 conductive properties (i.e., less electrically resistive), lubricative properties, etc. The incorporation of conductive materials into the polymeric film sheet 202 (e.g., graphite, carbon black, etc.) may increase the transfer of static charge to a conductive inner layer when a conductive inner layer (e.g., foil or metallized polymeric sheet, scrim, porous media layer) is positioned immediately adjacent to the polymeric film sheet 202.

The foil or metallized polymeric film sheet 208, the scrim 206, the porous media sheet 204, and the polymeric film sheet 202 may be bonded or adhered together using one or more adhesives (not shown). The adhesive or adhesives used may be contact type, pressure sensitive, heat seal, etc. and may include one or more additives to enhance the performance, stiffness, dimensional stability, moisture resistance, handleability, fire and smoke propagation resistance, and/or durability of the laminate 200. In addition, the additives may make the porous media conductive and, hence, the laminate conductive (e.g., the adhesive could include graphite, carbon black, etc.). Examples of adhesives that can be used include, but are not limited to, melamine, urea formaldehyde, phenolic, polyurethane, acrylic, latex, and acrylo-nitrile. Additional adhesives that can be used include adhesives that can migrate into the porous media sheet 204 to improve the physical characteristics of the laminate 200 (e.g., improve UV stability, flame spread resistance, mold growth resistance, etc.). Examples of such migrating adhesives are colloidal silica or alumina, sodium or potassium silicate, ammonium phosphate stabilized with zinc oxide, magnesia or alumina; borax, and oxi-chloride stabilized with zinc oxide or magnesia.

Figure 3:
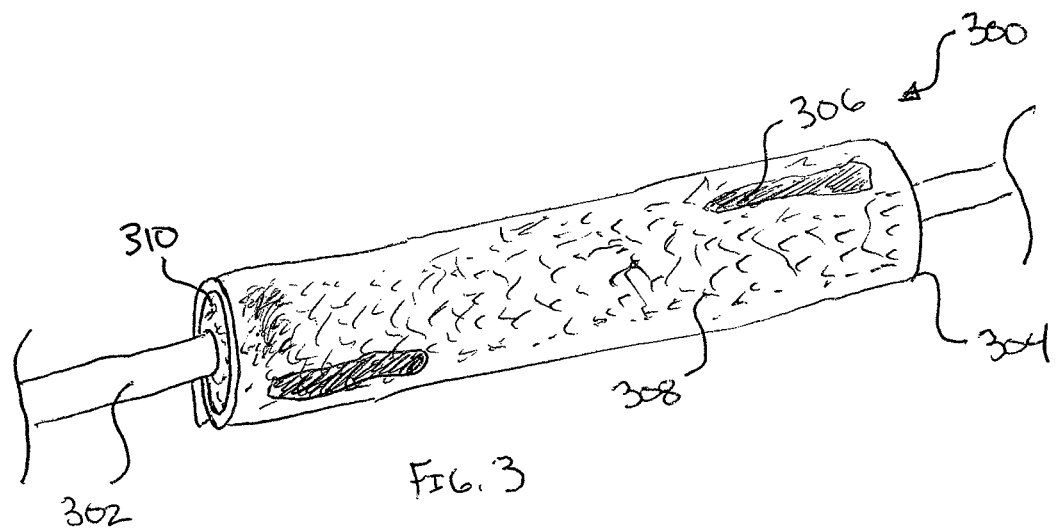
FIG. 3 is a schematic perspective view of the pipe insulation product fitted about a section of pipe wherein the pipe insulation product includes visible marks on the laminate's outer surface.

FIG. 3 depicts a pipe insulation product 300 fitted about a section of pipe 302. The pipe insulation product 300 includes a laminate 304 that includes one or more visible scars or marks 306 and 308 on the outer surface of the laminate. Specifically, the visible marks or scars could be scuff marks 306 due to the pipe insulation product 300 rubbing against another pipe insulation product and/or against the wall or edge of a shipping container during shipping (i.e., shipping damage). The scuff marks 306 may appear brownish, yellowish, or grayish-black and may run along a portion of the longitudinal length of the pipe insulation product 300. The scuff marks may degrade the visual appeal of the laminate 304 and, therefore, the visual appeal of the pipe insulation product 300.

In addition, the visible marks or scars could be an accumulation of dust 308 on the outer surface of the laminate 304. The dust 308 may accumulate and adhere to the laminate's outer surface due to a static charge generated by friction as the pipe insulation product jostle and vibrate during friction. The dust accumulation 308 may include dust from the environment surrounding the pipe insulation product 300 and/or may include particles of the pipe insulating product's insulating material 310. For example, the dust 308 may be particles of fiber glass, foam, etc. insulation that are knocked loose and/or expelled from the tubular core during shipment and/or handling. As the particles are knocked loose and/or expelled, the static charge on the laminate's outer surface may attract and adhere the particles to the outer surface.

Accumulation of the dust particles 308 may make the laminate's outer surface appear dull and/or yellowish or otherwise degrade the smooth, finished, visually appealing appearance of the pipe insulation product 300. The dust 308 may further transfer to the hands and/or clothing of individuals who handle the pipe insulation product 300. In any event, the dust particles 308 and/or scuff marks 306 may leave a handler and/or individual viewing the pipe insulating product 300 with a negative impression of the quality of the pipe insulation product 300.

Figure 4:
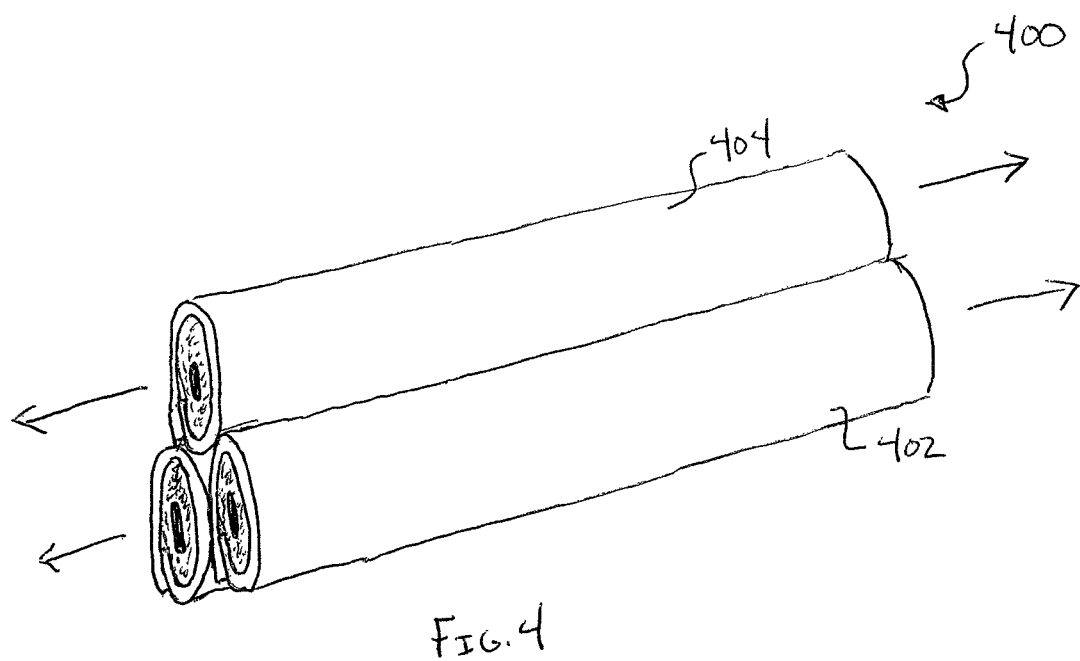
FIG. 4 is a schematic perspective view illustrating a plurality of pipe insulation products packaged for shipping.

FIG. 4 depicts an arrangement 400 of pipe products packaged for shipping. The arrangement 400 may include a plurality of pipe insulation products 402 and 404 that are stacked atop one another. As illustrated in the figure, the pipe insulation products may directly contact one another. In addition, pipe insulation products on the edge or the packaged products may directly contact the walls or edges of the packaging container. The arrows indicate the vibrational forces that may be imparted to the pipe insulation products and/or the jostling that may occur during shipment. As discussed above, the outer layer of the pipe insulation product's laminate may include a polymeric film sheet, which may impede dissipation of a generated static charge because of the non-conductive nature of the polymeric film sheet. This may result in the static charge increasing in voltage and, therefore, may result in an increase in dust particle attraction and adherence. It may further increase the likelihood of static discharge between the pipe insulation product and a surrounding object (e.g., a handler).

Figure 5:
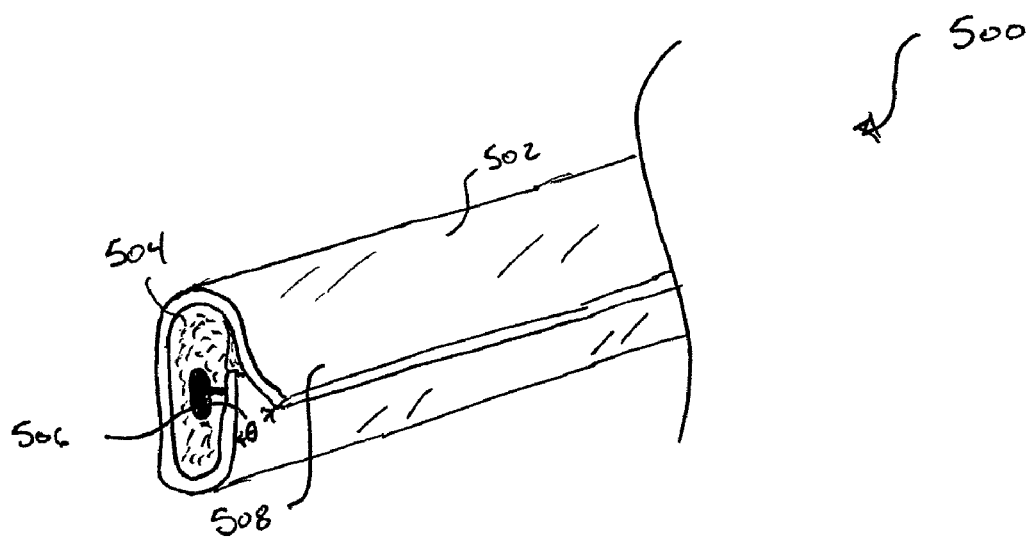
FIG. 5 is a schematic perspective view of a pipe insulation product illustrating of failure of the closure flap's adhesive seal.

FIG. 5 illustrates a failure of the closure flap's adhesive seal that may occur due to over accumulation of dust particles or due to over application of the charge dissipator. FIG. 5 depicts a pipe insulation product 500 that includes a laminate 502 and tubular core 504 as previously described. The laminate 502 includes a closure flap 508 that includes an adhesive material (not shown, but on the underside of the depicted closure flap) to adhesively seal or couple the laminate 502 so that the tubular core 504 may be partially or fully wrapped or enclosed within the laminate 502. The adhesive may be a pressure sensitive adhesive so that the laminate 502 may be adhesively sealed in the closed position by folding the closure flap 508 over a portion of the laminate 502 and by applying pressure to the outer surface of the closure flap 508 directly above the pressure sensitive adhesive.

The adhesive seal prevents one or more environmental elements (e.g., water vapor) from penetrating into the laminate's 502 core by preventing the elements from flowing circumferentially between the closure flap 508 and the portion of the laminate 502 that is overlapped by the closure flap 508 (i.e., the adhesive seal prevents circumvention of the laminate's protective and shielding function). In other words, the adhesive seal functions to retard the flow of elements into the laminate's 502 interior similar to the foil or metallized polymeric sheet and the butt strips. Maintaining the sealed closed position is a critical function of the closure flap 508 and adhesive material so that the insulated pipe and/or insulating material are not subjected to one or more environmental elements, such as water vapor, which may corrode or degrade the pipes and/or insulating material. The integrity of the adhesive seal (both the adhesive seal of the closure flap and the butt strips) is critical in maintaining the transmission retarding function of the laminate. Failure of the adhesive seal may result in damage to and/or failure of the pipe insulation product 500 and/or in damage to the pipes, piping system, building or structure in which the pipe insulation product is used, surrounding objects, etc.

FIG. 5 further depicts a failure of the adhesive material to seal the closure flap 508. The figure depicts an angle θ 506 that represent the degree in which the closure flap 508 has lifted or pulled away from the laminate's 502 outer surface. The closure flap 508 may also separate from the laminate's outer surface in other ways, such as one of the closure flap's edges peeling away or a bubble in the middle of the closure flap. In any event, the adhesive material may fail to properly seal the closure flap 508 along the length of the laminate 502. One potential reason that the adhesive material may not properly seal is due to an over accumulation of dust particles on the laminate's outer surface and/or over application of the charge dissipating material. The overly accumulated dust particles or overly applied charge dissipator may stick to the adhesive material and/or degrade the adhesive material so that the adhesive material is not strong enough and/or present in enough quantity to properly seal the laminate 502. To alleviate this problem, the charge dissipating material must be applied in a quantity sufficient to minimize the accumulation of dust particles while maintaining the integrity of the seal (i.e., not overly applied).

Figure 6:
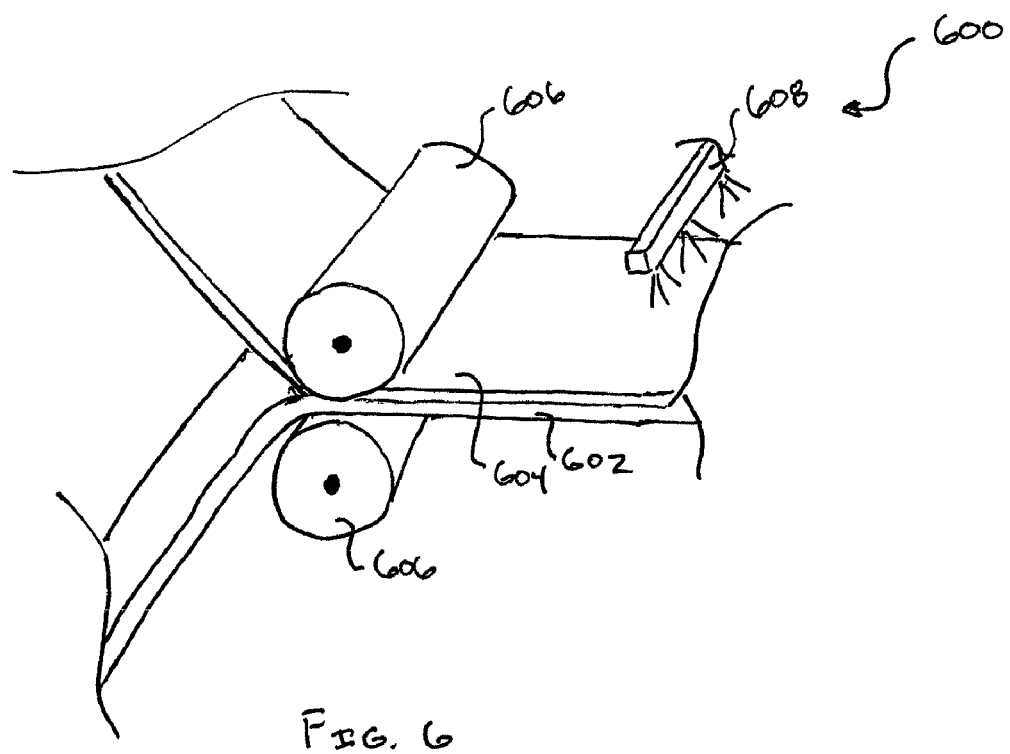
FIG. 6 is a schematic perspective view illustrating a system for manufacturing a laminate for a pipe insulation product.

FIG. 6 illustrates a system 600 for manufacturing the pipe insulation product. The system may comprise a plurality of rollers 606 that may compress a plurality of layers 602 and 604 (e.g., the foil or metallized polymeric sheet, scrim, porous media sheet, and polymeric film sheet) to form a single multilayered laminate. The figures illustrates two layers being compressed together, but the system could include other layers (or one of the layers could be pre-compressed and include multiple layers). In addition, the adhesive material may be applied prior to the rollers 606 compressing the laminate layers 602 and 604, a series of rollers could be used, the system may include one or more belts that contact the laminate or laminates layer, etc. The layers may be arranged in any fashion previously described. For example, the laminate may be arranged so that the polymeric film sheet outer layer is immediately adjacent to a conductive inner layer.

As the layers of the laminate layers 602 and 604 (or the laminate itself) pass over and contacts the rollers 606, belts, and/or other equipment, a static charge may be generated in the laminate or in the individual layers 602 and 604. The static charge may remain in the laminate and/or in the layers 602 and 604 due the non-conductive nature of one or more layers 602 and 604. To dissipate a generated static charge, the laminate may be manufactured to be more conductive as described above (e.g., conductive inner layers immediately adjacent to the polymeric film sheet outer layer) and/or a charge dissipator may be applied to the laminate to dissipate the static charge. For example, FIG. 6 illustrates a spray mechanism 608 that may spray a charge dissipator to the laminate. The spray mechanism 608 may spray water, ionized air, or any other charge inhibiting/dissipating substance. The charge dissipator may also be applied topically during manufacturing (e.g., brush coating or rolling the charge dissipator onto the laminate's outer layer) and/or after manufacturing of the pipe insulation product (e.g., sprayed on/coated by a handler prior to shipping).

Figure 7:
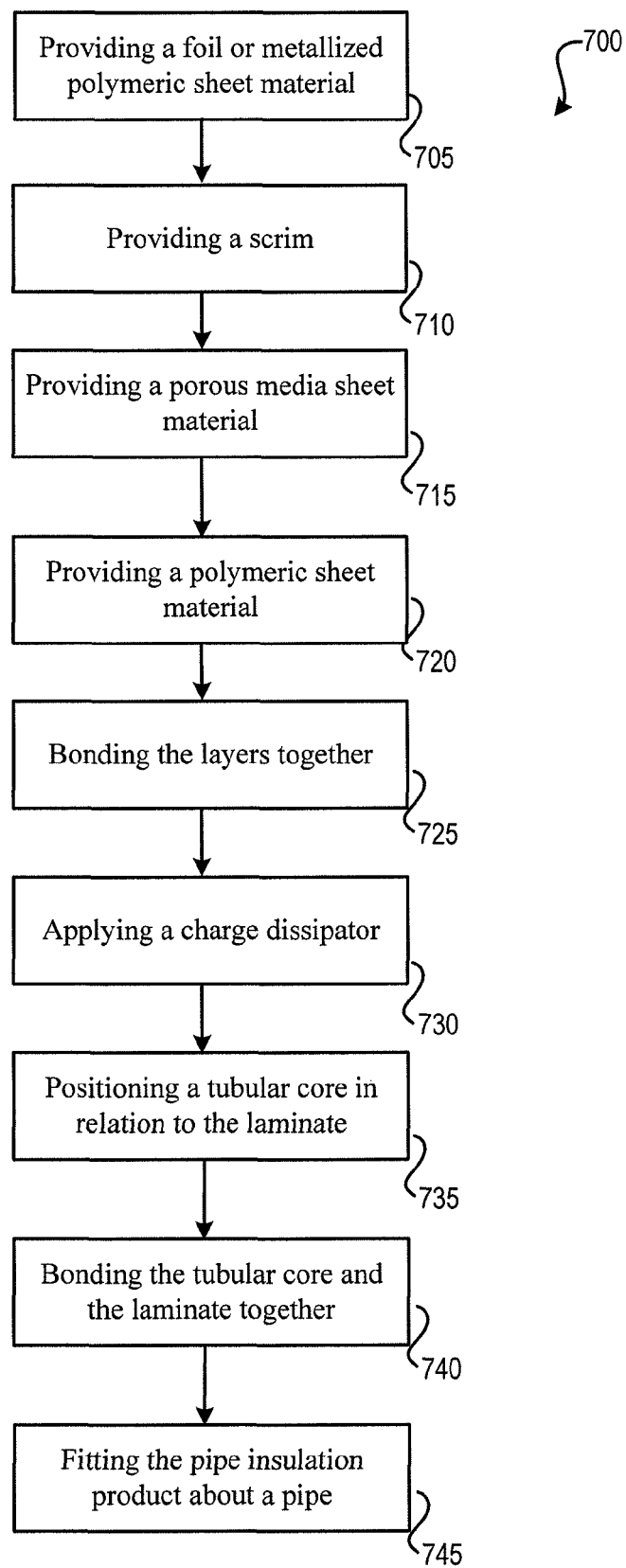
FIG. 7 is a flow diagram illustrating a method for manufacturing a pipe insulation product.

FIG. 7 illustrates a flow diagram 700 of a method for manufacturing a pipe insulation product according to one embodiment of the present invention. At block 705, a foil or metallized polymeric sheet may be provided. The foil or metallized polymeric sheet may form an inner layer of the laminate and may provide a fluid vapor barrier to minimize fluid vapor transmission through the laminate. At block 710, a scrim may be provided. The scrim may include a mesh of a plurality of fibers.

At block 715, a porous media sheet material may be provided. At block 720, a polymeric sheet material may be provided. The polymeric sheet material may form an outer exposed layer of the laminate. At block 725, the foil or metallized polymeric sheet material, the scrim, the porous media sheet material, and the polymeric sheet material may be bonded together via an adhesive material to form the laminate jacket. At block 730, a charge dissipator may be applied to the polymeric sheet material.

At block 735 a tubular core of insulating material may be positioned relative to the laminate so that the tubular core can be wrapped or encased within the laminated. At block 740, the laminate and tubular core may be bonded together to form the pipe insulation product. The pipe insulation product may be flexible so that the tubular core and laminate can be opened, placed about a pipe, and closed without degrading the laminate jacket. At block 745, the pipe insulation product may be fitted about a pipe to insulate and/or protect the pipe as described previously.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A pipe insulation product comprising:
   a tubular core of insulating material, the tubular core comprising:
      a length and a longitudinal axis;
      a substantially cylindrical outer surface;
      a substantially cylindrical inner surface; and
      a wall extending between the cylindrical outer surface and the cylindrical inner surface, the wall of the tubular core having a radially extending thickness, the wall of the tubular core having a slit extending completely there through, the slit extending parallel to the longitudinal axis of the tubular core for the length of the tubular core;
   a laminate that is roughly rectangular in shape and that is coextensive with and bonded to the substantially cylindrical outer surface of the tubular core and flexible so that the tubular core and laminate can be opened, placed about a pipe, and closed without degrading the laminate, the laminate comprising:
      a foil or metallized polymeric film sheet layer forming an inner layer of the laminate, wherein the foil or metallized polymeric film sheet layer is bonded to the substantially cylindrical outer surface of the tubular core, and wherein the foil or metallized polymeric film sheet layer provides a fluid vapor barrier to minimize fluid vapor transmission through the laminate;
      a scrim comprising a mesh of a plurality of fibers;
      a porous media sheet layer, wherein at least one of the scrim and porous media sheet layer provide reinforcement for the laminate;
      a polymeric film sheet layer forming an outer exposed layer of the laminate; and
      an adhesive, wherein:
         the adhesive bonds the foil or metallized polymeric film sheet layer, the scrim, the porous media sheet layer, and the polymeric film sheet layer together to form the laminate, and
         the laminate comprises a closure flap configured to adhesively couple opposite sides of the laminate so that the laminate forms a substantially cylindrical shape with at least a portion of the tubular core enclosed therein; and
   a charge dissipator applied to the polymeric film sheet layer in an amount sufficient to reduce a static charge on the exterior surface of the laminate without affecting the closure flap's ability to adhesively couple the opposite ends of the laminate, wherein the charge dissipator provides increased resistance to shipping damage during transportation of the pipe insulation product.

2. The pipe insulation product of claim 1, wherein the charge dissipator provides increased resistance to shipping damage by reducing friction between the pipe insulation product and one or more surrounding objects during transportation of the pipe insulation product.

3. The pipe insulation product of claim 1, wherein the charge dissipator reduces a static charge by reducing the generation of a static charge on the exterior surface of the laminate.

4. The pipe insulation product of claim 3, wherein the charge dissipator comprises one or more compounds selected from the group consisting of:
- a quaternary ammonium cation;
- an alkylphenol;
- a glycol;
- glycol esters;
- water; and
- ionized air.

5. The pipe insulation product of claim 1, wherein the shipping damage comprises one or more types of damage selected from the group consisting of:
- scuffing; and
- particle accumulation on outer surface of the laminate due to static charge on the laminate's outer surface.

6. The pipe insulation product of claim 1, wherein the polymeric film sheet layer comprises the charge dissipator.

7. The pipe insulation product of claim 1, wherein the charge dissipator is applied topically to the polymeric film sheet layer.

8. The pipe insulation product of claim 1, wherein the polymeric film sheet layer is selected from the group consisting of:
- polypropylene;
- polyethylene;
- polyvinyl chloride;
- vinyl;
- saran;
- polyethylene terephthalate; and
- thermoplastic polyolefin.

9. The pipe insulation product of claim 1, wherein the pipe insulation is transported via a transportation vehicle for eventual installation, and wherein the pipe insulation product is transported in close proximity to one or more products so that friction occurs between the pipe insulation product and the one or more products.

10. The pipe insulation product of claim 1, wherein:
- a charge dissipator is applied to the polymeric film sheet layer when the laminate is manufactured to remove a static charge generated during the manufacture of the polymeric film sheet layer or the laminate, and
- the charge dissipator comprises a water spray or an air ionizer.

11. A method for producing a roughly rectangular laminate jacket for a pipe insulation product, the method comprising:
providing a foil or metallized polymeric sheet material, the foil or metallized polymeric sheet material forming an inner layer of the laminate that provides a fluid vapor barrier to minimize fluid vapor transmission through the laminate, the foil or metallized polymeric sheet material comprising:
- a length,
- a width,
- a first face, and
- a second face, wherein the length and width form an area that define the first face and the second face;
providing a scrim comprising a mesh of a plurality of fibers, wherein the scrim is substantially coextensive with the second face;
providing a porous media sheet material, wherein the porous media is substantially coextensive with the second face, and wherein at least one of the scrim and porous media sheet layer provide reinforcement for the laminate;
providing a polymeric sheet material, wherein the polymeric sheet material is coextensive with the second face and the polymeric sheet material forms an outer exposed layer of the laminate;
bonding, via an adhesive material, the foil or metallized polymeric sheet material, the scrim, the porous media sheet material, and the polymeric sheet material together to form the laminate jacket, wherein the laminate jacket comprises a closure flap configured to adhesively couple opposite sides of the laminate jacket so that the laminate jacket forms a hollow cylindrical shape; and
applying a charge dissipator to the polymeric film sheet material in an amount sufficient to reduce a static charge on the exterior surface of the laminate jacket without affecting the closure flap's ability to adhesively couple the opposite ends of the laminate jacket, wherein the charge dissipator provides increased resistance to shipping damage during transportation of the pipe insulation product.

12. The method for producing a laminate jacket as in claim 11, the method further comprising:
positioning a tubular core of insulating material directly adjacent the first face of the foil or metallized polymeric sheet material, wherein the tubular core comprises:
- a length and a longitudinal axis;
- a substantially cylindrical outer surface, the substantially cylindrical outer surface comprising a surface area that is roughly equivalent to the area of the first face;
- a substantially cylindrical inner surface; and
- a wall extending between the cylindrical outer surface and the cylindrical inner surface; the wall comprising:
  - a radially extending thickness; and
  - a slit extending from the cylindrical outer surface to the cylindrical inner surface and extending parallel to the longitudinal axis of the tubular core for the length of the tubular core; and
bonding, via an adhesive material, the tubular core of insulating material with the first face of the foil or metallized polymeric sheet material to form the pipe insulation product, wherein the pipe insulation product is flexible so that the tubular core and laminate jacket can be opened, placed about a pipe, and closed without degrading the laminate jacket.

13. The method for producing a laminate jacket as in claim 11, wherein the charge dissipator is applied to the polymeric film sheet material so that the charge dissipator is incorporated into the polymeric film sheet material.

14. The method for producing a laminate jacket as in claim 11, wherein the charge dissipator is applied topically to the polymeric film sheet material.

15. The method for producing a laminate jacket as in claim 11, wherein the charge dissipator reduces a static charge by reducing the generation of a static charge on the exterior surface of the laminate.

16. The method for producing a laminate jacket as in claim 11, wherein the charge dissipator provides increased resistance to shipping damage by reducing friction between the pipe insulation product and one or more surrounding objects during transportation of the pipe insulation product.

17. A pipe insulation product comprising:
a tubular core of insulating material, the tubular core comprising:
- a length and a longitudinal axis;

a substantially cylindrical outer surface;

a substantially cylindrical inner surface; and a wall extending between the cylindrical outer surface and the cylindrical inner surface, the wall of the tubular core having a radially extending thickness, the wall of the tubular core having a slit extending completely there through, the slit extending parallel to the longitudinal axis of the tubular core for the length of the tubular core;

a laminate that is coextensive with and bonded to the substantially cylindrical outer surface of the tubular core and flexible so that the tubular core and laminate can be opened, placed about a pipe, and closed without degrading the laminate, the laminate comprising:

a foil or metallized polymeric film sheet layer, wherein the foil or metallized polymeric film sheet layer provides a fluid vapor barrier to minimize fluid vapor transmission through the laminate;

a porous media layer that provides reinforcement for the laminate;

a polymeric film sheet layer forming an outer exposed layer of the laminate; and an adhesive, wherein the adhesive bonds the foil or metallized polymeric film sheet layer, the porous media layer, and the polymeric film sheet layer together, wherein either or both the porous media layer and the foil or metallized polymeric film sheet layer:

is an electrically conductive material; and is configured to dissipate a charge that is generated on the surface of the laminate.

18. The pipe insulation product of claim 17, wherein:

the porous media layer comprises a porous media and a scrim comprising a mesh of a plurality of fibers;

the scrim is an electrically conductive material; and the scrim is positioned directly adjacent to the polymeric film sheet layer to dissipate the charge from the laminate's outer surface.

19. The pipe insulation product of claim 17, wherein the foil or metallized polymeric film sheet layer is positioned directly adjacent to the polymeric film sheet layer to dissipate the charge from the laminate's outer surface.

20. The pipe insulation product of claim 17, wherein either or both the porous media layer and the foil or metallized polymeric film sheet is an electrically conductive material by including an electrically conductive additive in the adhesive.

* * * * *